(12) United States Patent
McLean et al.

(10) Patent No.: US 8,166,833 B2
(45) Date of Patent: May 1, 2012

(54) STATE OF CHARGE INDICATOR AND METHODS RELATED THERETO

(75) Inventors: Gerard F McLean, West Vancouver (CA); Joerg Zimmermann, Vancouver (CA)

(73) Assignee: Société BIC, Clichy (FR)

( * ) Notice: Subject to any disclaimer, the term of this patent is extended or adjusted under 35 U.S.C. 154(b) by 1005 days.

(21) Appl. No.: 11/644,999

(22) Filed: Dec. 22, 2006

(65) Prior Publication Data

US 2008/0152958 A1 Jun. 26, 2008

(51) Int. Cl.
*G01G 9/00* (2006.01)
(52) U.S. Cl. .................. 73/865; 429/421; 206/0.7
(58) Field of Classification Search .......... 73/865; 206/0.7; 429/421, 513, 515
See application file for complete search history.

(56) References Cited

U.S. PATENT DOCUMENTS

| | | | |
|---|---|---|---|
| 5,249,454 A | 10/1993 | Kollie | |
| 5,287,729 A | 2/1994 | Lehmann | |
| 5,537,858 A | 7/1996 | Bauer | |
| 5,590,197 A | 12/1996 | Chen et al. | |
| 5,991,400 A | 11/1999 | Kamperman | |
| 6,105,134 A | 8/2000 | Pinder et al. | |
| 6,155,099 A | 12/2000 | Kobayashi et al. | |
| 6,227,041 B1 | 5/2001 | Collins et al. | |
| 6,285,179 B1 * | 9/2001 | Kubo et al. | 324/71.1 |
| 6,327,652 B1 | 12/2001 | England et al. | |
| 6,584,825 B2 | 7/2003 | Pratt et al. | |
| 6,804,357 B1 | 10/2004 | Ikonen et al. | |
| 6,869,708 B2 | 3/2005 | Kelley et al. | |
| 6,878,481 B2 | 4/2005 | Bushong et al. | |
| 7,101,512 B2 | 9/2006 | Hahs et al. | |
| 7,237,428 B2 | 7/2007 | DaCosta et al. | |
| 7,563,305 B2 * | 7/2009 | Zimmermann | 95/90 |
| 7,708,815 B2 * | 5/2010 | Zimmermann | 96/108 |
| 2004/0023087 A1 | 2/2004 | Redmond | |
| 2004/0200735 A1 * | 10/2004 | DaCosta et al. | 206/0.7 |
| 2005/0058879 A1 | 3/2005 | Guay | |
| 2005/0067281 A1 | 3/2005 | Shimada et al. | |
| 2005/0236591 A1 | 10/2005 | Withlin | |
| 2006/0166045 A1 | 7/2006 | Ryoichi | |
| 2007/0186662 A1 | 8/2007 | Linglin et al. | |
| 2007/0251822 A1 | 11/2007 | Hoagland et al. | |
| 2009/0007705 A1 | 1/2009 | McLean et al. | |

FOREIGN PATENT DOCUMENTS

| | | |
|---|---|---|
| CN | 1551977 A | 12/2004 |
| DE | 10046102 | 3/2002 |
| DE | 10109058 A1 | 9/2002 |
| JP | 3-89145 A * | 4/1991 |

(Continued)

OTHER PUBLICATIONS

Ao, B.Y. et al., "A Study on Wall Stresses Induced by LaNi5 Alloy Hydrogen Absorption-Desorption Cycles", Journal fo Alloys and Compounds, vol. 390, 2005, pp. 122-126.*

(Continued)

*Primary Examiner* — Daniel S Larkin
(74) *Attorney, Agent, or Firm* — Schwegman, Lundberg & Woessner, P.A.

(57) ABSTRACT

Embodiments of the invention relate a charge indicator for determining the mass of a fluid contained within a fluid enclosure, wherein the charge indicator responds to a deformation of a solid component in contact with the fluid and wherein the deformation is a function of the mass of fluid contained within the fluid enclosure.

48 Claims, 7 Drawing Sheets

FOREIGN PATENT DOCUMENTS

| | | |
|---|---|---|
| JP | 835821 A | 2/1996 |
| WO | WO-03/008916 A1 | 1/2003 |
| WO | WO-2008/077252 A1 | 7/2008 |

OTHER PUBLICATIONS

Heung, "Using Metal Hydride to Store Hydrogen", WSRC-MC, 2003, pp. 1-8.*

U.S. Appl. No. 10/480,268, Response filed Dec. 19, 2007 to Non-Final Office Action mailed Sep. 20, 2007, 10 pgs.

"U.S. Appl. No. 10/480,268, Response filed May 19, 2008 to Final Office Action mailed Mar. 17, 2008", 10 pgs.

"U.S. Appl. No. 10/480,268, Non-Final Office Action mailed Sep. 20, 2007", 14 pgs.

"U.S. Appl. No. 10/480,268, Final Office Action mailed Mar. 17, 2008", 14 pgs.

"International Application Serial No. PCT/CA2007/002350, International Search Report mailed Apr. 25, 2008", 3 pgs.

"International Application Serial No. PCT/CA2007/002350, Written Opinion mailed Apr. 25, 2008", 4 pgs.

"Chinese Application Serial No. 200780051334.X, First Office Action mailed Jun. 13, 2010", (w// English Translation), 12 pgs.

"Singapore Application Serial No. 200904275-5, Office Action mailed Jul. 13, 2010".

"U.S. Appl. No. 12/144,619 , Response filed Aug. 3, 2011 to Non Final Office Action mailed Apr. 5, 2011", 16 pgs.

"U.S. Appl. No. 12/144,619, Final Office Action mailed Nov. 21, 2011", 27 pgs.

"European Application Serial No. 07855630.5, Supplementary European Search Report mailed Feb. 13, 2012", 7 pages.

* cited by examiner

STATE OF CHARGE INDICATOR AND METHODS RELATED THERETO

TECHNICAL FIELD

Embodiments of the present invention relate to a state of charge indicator. More specifically, embodiments of the invention relate to a state of charge indicator for a fluid enclosure, such as with a fuel cell system.

BACKGROUND

When using any consumable power source, a determination of the amount of operating time left before refueling is a consistent problem. For metal hydride fuel storage systems, this problem becomes especially difficult. Metal hydrides are often used to store fuels, such as hydrogen, in conjunction with fuel cells for electrochemical generation of power. Hydrogen is absorbed into a metal alloy, creating a hydride of the alloy.

Measuring the weight of the fluid stored within metal hydrides is error prone as the fluid weight is low compared to the overall weight of the system. The error in weight-based fuel gauging increases dramatically as the amount of fuel in a system lowers, leading to great uncertainty in a weight-based assessment.

In powder-based hydride systems, some try to correlate internal pressure to a state of charge. This method does not work well as hydrides are designed to operate at a constant pressure until they are nearly fully discharged. Also, this constant pressure of operation is highly correlated with environmental temperature. Therefore, any pressure-based measurement of a hydride system is a better indicator of the system temperature than it is of the system state of charge. In addition, conventional hydride systems based on powders can pack and therefore induce large strains on an enclosure, confounding the determination as to whether any hydrogen remains in the enclosure.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1:
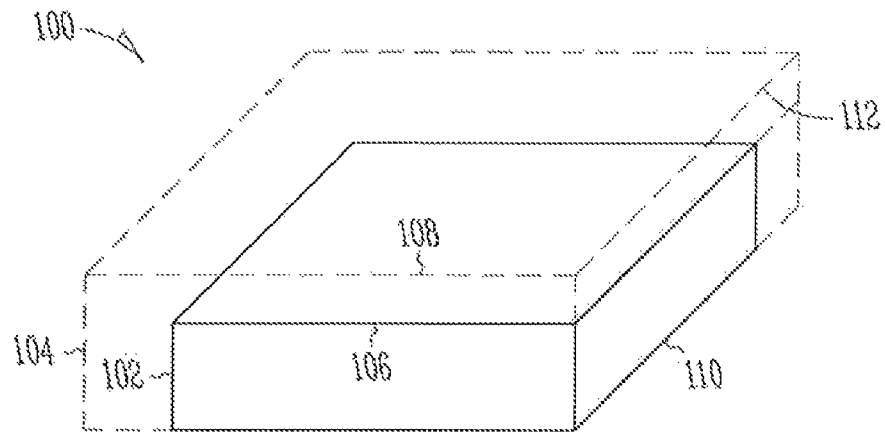
FIG. 1 illustrates a perspective view of a component and its dimensions associated with a deformation, according to some embodiments.

Embodiments of the invention relate to a charge indicator for determining the mass of a fluid contained within a fluid enclosure, wherein the charge indicator responds to a deformation of a solid component in contact with the fluid and wherein the deformation is a function of the mass of fluid contained within the fluid enclosure.

Embodiments also relate to a fuel cell system. The fuel cell system comprises a fluid enclosure, one or more solid components in contact with the fluid enclosure, and a charge indicator in contact with at least one of the one or more solid components and fluid enclosure. Further, the fuel cell system comprises one or more fuel cells in contact with at least one of the one or more the solid components, charge indicator and fluid enclosure. The charge indicator responds to a deformation of one or more of the solid components or fluid enclosure and the deformation is a function of the mass of a fluid contained within the fluid enclosure.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention relate to a state of charge indicator in contact with a fluid enclosure. The state of charge indicator may respond to a deformation of a component, such as a fluid enclosure or fluid storage material. The deformation may be a function of the state of charge of the fluid enclosure. The deformation may be a direct result of the mass of fluid contained within the fluid enclosure and not simply a measure or result of a pressure change, similar to conventional measurements. Unlike strain measurements on traditional rigid enclosures, embodiments of the invention relate to deformations greater than about 1%, greater than about 3% or between about 3% and about 10%, for example. By responding to a deformation, the state of charge indicator relies on an effect directly related to the state of charge of the fluid enclosure and not on any secondary effects. The response to a deformation may be substantially independent of secondary effects, such as environmental temperature, fluid storage material settling, environmental barometric pressure, environmental humidity, aging of fluid storage material or combinations thereof. Substantially independent may indicate an error in determination of the state of charge of less than about 1%, for example.

Definitions

As used herein, "charge indicator" or "state of charge indicator" refers to a device or instrument that senses or converts a signal relating to the charge of a fluid in a fluid enclosure. Transducers are an example of a charge indicator.

As used herein, "transducer" refers to a device that senses or converts one form of a signal to another. A mechanical linkage is an example of a transducer.

As used herein, "indicating" or "indicate" refers to signifying or displaying. A charge indicator may indicate or signify the state of charge of a fluid enclosure.

As used herein, "state of charge" refers to a mass of fluid contained within a fluid enclosure. State of charge may refer to an absolute mass of fluid, or to a mass of fluid relative to a mass of fluid contained within a fluid enclosure when said enclosure is "full" or substantially full, for example.

As used herein, "responding" or "responds" refers to acting in reply to a stimulus. Responding may include physical, chemical or electrical reply to a stimulus, such as a deformation.

As used herein, "determine" or "determining" refers to ascertaining, such as by measuring for example. Determining may include indicating or an indication may be subsequent to a determination, for example.

As used herein, "deformation" refers to an alteration of shape. The deformation may be in any dimension, for example. A solid component, such as a fluid enclosure, may deform when in contact with a fluid, for example. A deformation of a solid component may be greater than about 1%, between about 1% and about 3% or between about 3% and about 10%, for example. The deformation of a solid component may be in response to a change in strain state of a solid component, for example.

As used herein, "change" or "changing" refers to becoming different or undergoing alteration or transformation.

As used herein, "change in strain state" refers to an altered state caused by an external force. For example, an altered state may include physical deformation or changes in electrical resistance. An external force may be physical, chemical or an electrical force, for example. A physical force may be a deformation caused by an increased or decreased mass of fluid in a flexible fluid enclosure, for example.

As used herein, "strain state" refers to a state of a material dependent on any strain exposed to the material.

As used herein, "function" refers to a variable so related to another that for each value assumed by one there is a value determined for the other. For example, deformation may be a function of the state of charge of a fluid enclosure such that as fluid mass within the enclosure varies, the deformation varies in a determinable way.

As used herein, "observable property" refers to a property of a material that can be measured or visually monitored. A material that changes color upon displacement is an example of an observable property.

As used herein, "secondary effects" refers to external forces that may affect a response to the state of charge of a fluid in contact with a fluid enclosure. For example, secondary effects may include environmental temperature, barometric pressure, humidity, fluid storage material settling, fluid storage material aging or combinations thereof.

As used herein, "displaying" refers to a visual representation of information. For example, displaying may refer to the creation or use of visible words, indicating lines, patterns, digital numbers, etc. in response to a state of charge of a fluid enclosure. Displaying may also refer to the illustration of words, symbols, or numbers on an electronic screen, such as an LCD screen, for example.

As used herein, "composite hydrogen storage material" refers to active material particles mixed with a binder, wherein the binder immobilizes the active material particles sufficient to maintain relative spatial relationships between the active material particles. Examples of composite hydrogen storage materials are found in commonly-owned U.S. Patent. application Ser. No. 11/379,970, filed 24 Apr. 2006, and issued as U.S. Pat. 7,708,815 on 4 May 2010, the disclosure of which is incorporated by reference herein in its entirety.

As used herein, "metal hydride particles" or "metal hydrides" refer to metal or metal alloy particles that are capable of forming metal hydrides when contacted with hydrogen. Examples of such metal or metal alloys are FeTi, $ZrV_2$, $LaNi_5$, $Mg_2Ni$ and V. Such compounds are representative examples of the more general description of metal hydride compounds: AB, $AB_2$, $A_2B$, $AB_5$ and BCC, respectively. When bound with hydrogen, these compounds form metal hydride complexes, such as $MgH_2$, $Mg_2NiH_4$, $FeTiH_2$ and $LaNi_5H_6$, for example. Examples of metals used to form metal hydrides include vanadium, magnesium, lithium, aluminum, calcium, transition metals, lanthanides, and intermetallic compounds and solid solutions thereof.

As used herein, "fluid" refers to a gas, liquefied gas, liquid, liquid under pressure or any one of the above in physical or chemical contact with a fluid storage material. Examples of fluids include hydrogen, methanol, ethanol, formic acid, butane, borohydride compounds, etc. Fluid may be amorphous and free-flowing or in physical or chemical contact with a fluid storage material. A fluid may be bound to absorbing materials, for example.

As used herein, "occluding/desorbing material" refers to a material capable of absorbing, adsorbing or retaining a substance and further capable of allowing the substance to be removed. The occluding/desorbing material may retain the substance chemically or physically, such as by chemisorption or physisorption, for example. Examples of such a material include metal hydrides, composite hydrogen storage materials, clathrates, etc.

As used herein, "occlude" or "occluding" or "occlusion" refers to absorbing or adsorbing and retaining a substance. Hydrogen may be the substance occluded, for example. A substance may be occluded chemically or physically, such as by chemisorption or physisorption, for example.

As used herein, "desorb" or "desorbing" or "desorption" refers to the removal of an absorbed or adsorbed substance.

Hydrogen may be removed from active material particles, for example. The hydrogen may be bound physically or chemically, for example.

As used herein, "contacting" refers to physically, chemically or electrically touching or functionally integrating. A fluid may contact an enclosure, in which the fluid is physically forced inside the enclosure, for example. Contacting may include fluidic communication in which two or more components are in such position as to pass a fluid in one or more directions between them, for example. One or more fuel cells may contact a fluid enclosure, such as by fluidic communication. A fluid storage material may be functionally integrated within a fluid enclosure, such as being contained within (and yet, not be physically touching, for example).

As used herein, "releasing" refers to freeing from something that binds, fastens or holds back, either physically or chemically. A fluid may be physically released from an enclosure, for example. A fluid may be chemically or physically released from a fluid storage material, for example.

As used herein, "flexible fluid enclosure" or "flexible portion of a fluid enclosure" may refer to a fluid enclosure including a structural filler and an outer enclosure wall, conformably coupled to the structural filler. Examples of such a fluid enclosure are found in commonly-owned U.S. patent. application Ser. No. 11/473,591, filed 23 Jun. 2006 and issued as U.S. Pat. 7,563,305 on 21 ; Jul. 2009, whose disclosure is incorporated by reference herein in its entirety.

As used herein, "conformably coupled" refers to forming a bond that is substantially uniform between two components and are attached in such as way as to chemically or physically bind in a corresponding shape or form. A structural filler may be conformably coupled to an outer enclosure wall, for example, in which the outer enclosure wall chemically or physically binds to the structural filler and takes its shape.

As used herein, "outer enclosure wall" refers to the outermost layer within a fluid enclosure that serves to at least partially slow the diffusion of a fluid from the fluid enclosure. The outer enclosure wall may include multiple layers of the same or differing materials. The outer enclosure wall may include a polymer or a metal, for example.

As used herein, "structural filler" refers to a material with a sufficient tensile strength to withstand the internal pressure of a fluid enclosure, when pressurized with a fluid. Structural fillers may be solid. Structural fillers may include metallic or plastic lattices, composite hydrogen storage materials, clathrates, nano-structured carbon foams, aerogels, zeolites, silicas, aluminas, graphite, activated carbons, micro-ceramics, nano-ceramics, boron nitride nanotubes, borohydride powder, palladium-containing materials or combinations thereof, for example.

As used herein, "fluid storage material" refers to a material that may be in physical or chemical contact with a fluid, usually for the purpose of assisting the storage of the fluid. Hydrogen may be chemically bound with a metal alloy to provide a metal hydride, an example of a fluid storage material.

Referring to FIG. 1, a perspective view of a component 100 and its dimensions associated with a deformation is shown, according to some embodiments. A component 100 may alter its dimensions based on a deformation. In FIG. 1, for example, a component 100 may change dimensions 102, 106 and 110 to the larger dimensions of 104, 108 and 112 respectively, when charged with a fluid, such as hydrogen. Charging a component 100 may include filling, contacting, occluding, absorbing, adsorbing, etc. with a fluid, such as hydrogen. The component 100 may comprise a fluid storage material or a fluid enclosure, for example. The dimensions 104, 108 and 112 may be up to about 10% greater than dimensions 102, 106 and 110, for example. The change in dimensions may be reversible as the fluid mass decreases within the component 100. The shape of the component may be arbitrary or prismatic and any of its dimensions may be altered with a deformation, for example.

Many types of charge indicators may be utilized to respond to a deformation of component 100. A charge indicator may comprise a liquid or solid that may displace with a deformation. A charge indicator may include a solid that changes an observable property as it is displaced. An observable property may be color, for example. A charge indicator may be a mechanical indicator in contact with the component 100, for example. The charge indicator may respond directly to the deformation, such as with a mechanical linkage, or indirectly by responding to an electronic signal or change in electrical properties of the component 100 based on the deformation, for example. A charge indicator may include an optical interference pattern, such that a visual pattern may be created or altered based on the deformation. Examples of optical interference patterns may include faceted patterns, grids, pixels, one or more visible words, or combinations thereof. The charge indicator may include an array of conductors on the surface of the component and in contact with one or more fixed brushes, for example. As a deformation alters the dimensions of a component, the conductors may respond to the number of brushes currently in contact, for example.

In some embodiments, the component 100 may not be visible to a user. The charge indicator would then communicate information about the state of charge associated with a fluid enclosure from within a system, such as a fuel cell system, to some exterior location where the information may be communicated to a user or to a monitoring system, for example. A transducer, such as an electronic transducer, may be in contact with the component 100 and indicate the state of charge of the fluid enclosure as a function of the deformation of the component 100, for example. An extensometer or strain gauge may be an example of an electronic transducer. The deformation may also be monitored indirectly by responding to the electrical resistance of the component 100, such as with a charge-variable resistor, for example.

The component 100 may include a metal hydride, a composite hydrogen storage material or a mixture thereof. The component 100 may include a structural filler, such as metallic or plastic lattices, composite hydrogen storage materials, clathrates, nano-structured carbon foams, aerogels, zeolites, silicas, aluminas, graphite, activated carbons, micro-ceramics, nano-ceramics, boron nitride nanotubes, borohydride powder, palladium-containing materials or combinations thereof, for example. The component 100 may include a flexible fluid enclosure or a flexible portion of a fluid enclosure, for example.

Figure 2:
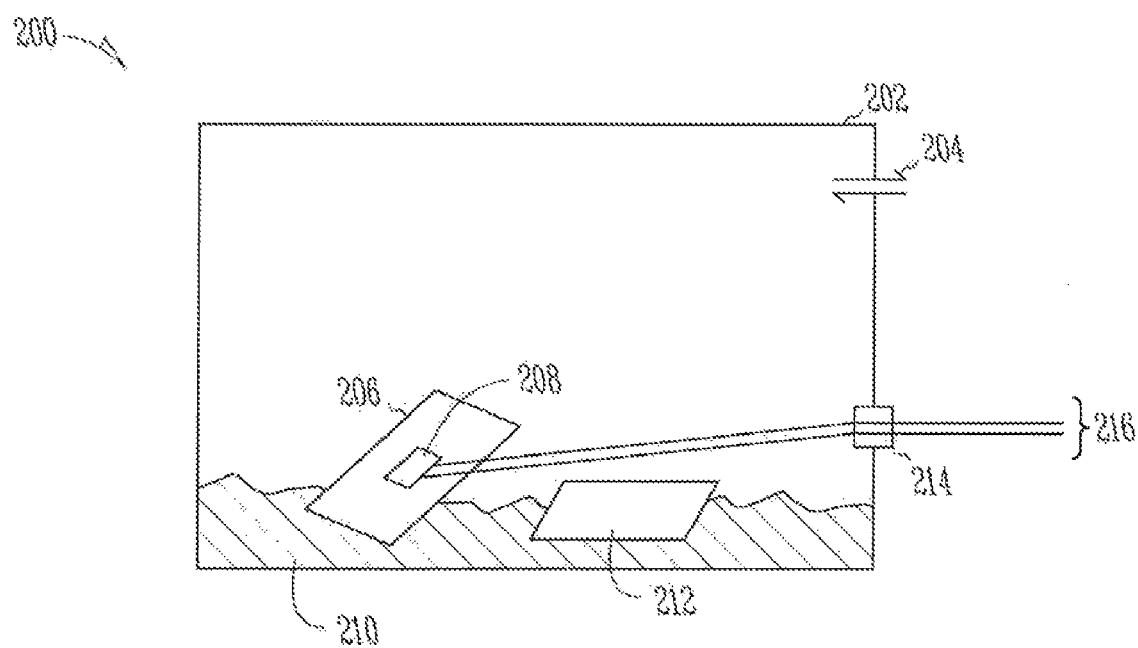
FIG. 2 illustrates a schematic view of a fluid enclosure containing a fluid storage material, according to some embodiments.

Referring to FIG. 2, a schematic view of a fluid enclosure containing a fluid storage material 200 is shown, according to some embodiments. A fluid enclosure 202 may enclose fluid storage material. The fluid storage material may comprise a composite hydrogen storage material 212, metal hydride powder 210 and a composite hydrogen storage material 206 in contact with a state of charge indicator 208. The state of charge indicator 208 may be a transducer and be in contact with transducer connector leads 216, for example. The leads 216 may be in contact with the fluid enclosure 202 through a sealed aperture 214, for example. A fluid inlet/outlet port 204 may also be positioned in contact with the fluid enclosure 202. As the strain state changes within the composite hydrogen storage material 212 and metal hydride powder 210, the state of charge of the fluid enclosure 202 may be monitored as the one or more composite hydrogen storage materials 206 in contact with a state of charge indicator 208 deforms, correlating to the state of charge of all fluid storage material within the fluid enclosure 202. The state of charge indicator 208 may be transducer, such as an extensometer, a resistance or fiber strain gauge, for example.

The fluid storage material may be capable of occluding/desorbing a fluid, for example. The composite hydrogen storage material 212 and 206 may be capable of occluding and desorbing hydrogen, for example. The fluid may be a gas, a liquefied gas, a liquid or a combination thereof. The fluid may be hydrogen, for example.

Figure 3:
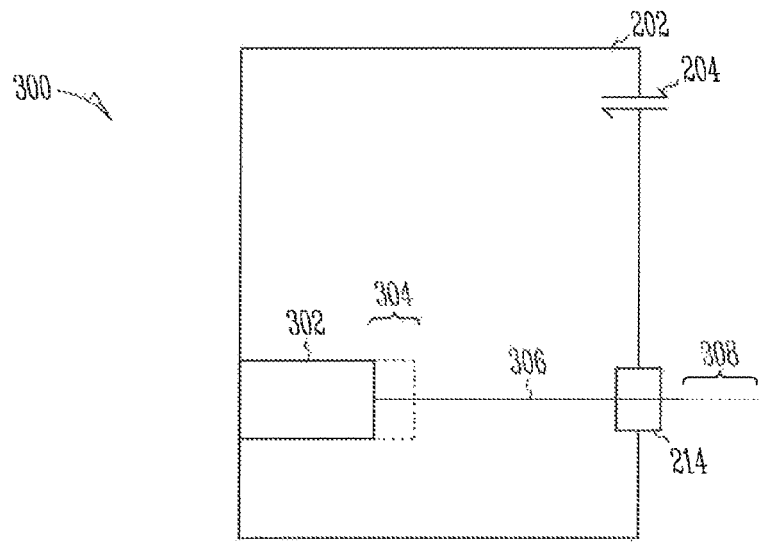
FIG. 3 illustrates a schematic view of a fluid enclosure including a mechanical transducer, according to some embodiments.

Referring to FIG. 3, a schematic view of a fluid enclosure including a mechanical transducer 300 is shown, according to some embodiments. A fluid enclosure 202 may enclose a fluid storage material 302. A mechanical transducer 306, such as a mechanical linkage, may be in contact with the fluid storage material 302. The mechanical transducer 306 may be in contact with the fluid enclosure 202 through a sealed aperture 214, for example. A fluid inlet/outlet port 204 may also be positioned in contact with the fluid enclosure 202. As the fluid storage material 302 deforms, it may change its dimensions 304. The mechanical transducer 306 would then change position 308 as a function of the deformation of the fluid storage material 302. The position change 308 may then be an indication of the state of charge or be used to communicate that information to a monitoring system, for example.

Figure 4:
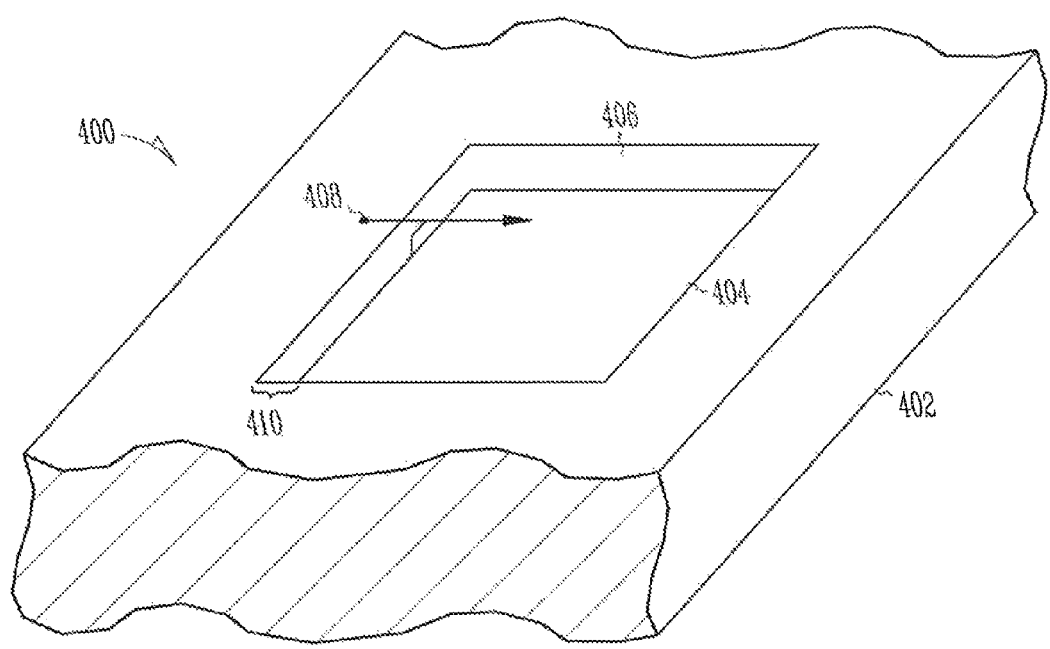
FIG. 4 illustrates a perspective view of a portion of an electronic device and a fluid enclosure, according to some embodiments.
Figure 5:
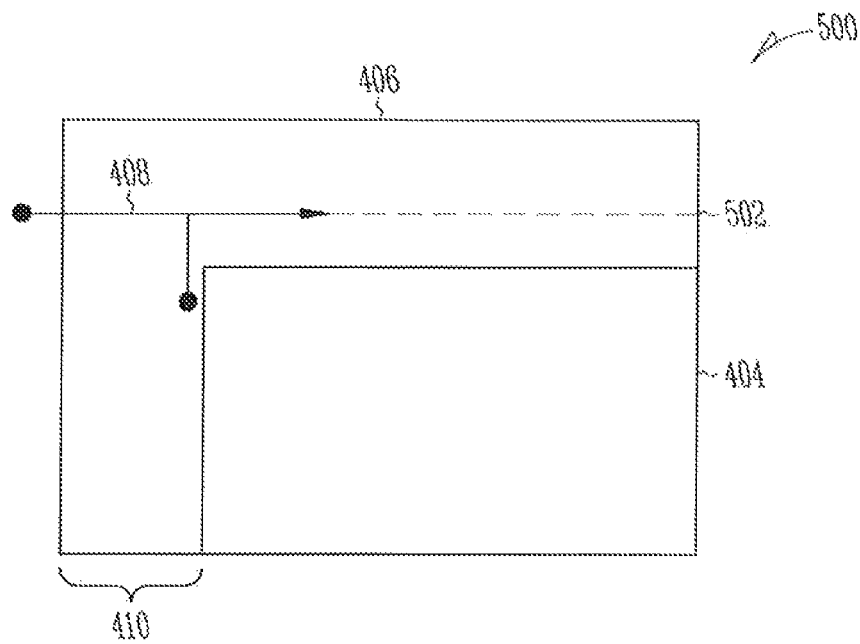
FIG. 5 illustrates a schematic view of a fluid enclosure in an empty state of charge, according to some embodiments.
Figure 6:
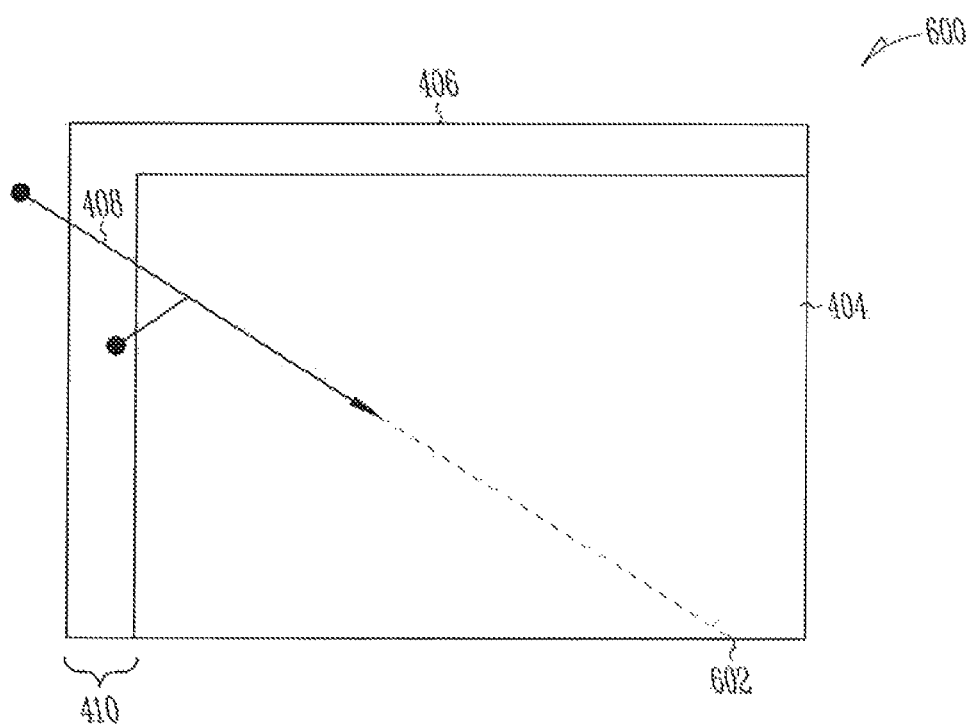
FIG. 6 illustrates a schematic view of a fluid enclosure in a full state of charge, according to some embodiments.

Referring to FIG. 4, a perspective view of a portion of an electronic device and a fluid enclosure 400 is shown, according to some embodiments. A portion of an electronic device 402 may surround a fluid enclosure 404 and a cavity 406 enclosing the fluid enclosure 404. A charge indicator 408 may be in contact with the fluid enclosure 404 and also in contact with the portion of an electronic device 402. As the fluid enclosure 404 deforms, the charge indicator 408 may respond to the deformation, such as by responding to the change in distance 410 between the fluid enclosure 404 and the cavity 406, for example. The charge indicator 408 may indicate an empty state of charge 502 of the fluid enclosure 404 (as shown in FIG. 5). As the fluid enclosure 404 changes dimensions in response to a deformation, the distance 410 between the fluid enclosure 404 and cavity 406 may change. The charge indicator 408 may then indicate a full state of charge 602 (as shown in FIG. 6).

The fluid enclosure 404 may be flexible or a portion of the fluid enclosure may be flexible, such that the deformation due to fluid mass within the fluid enclosure causes dimension changes or changes in electrical properties of the fluid enclosure, for example.

The charge indicator 408 may be a mechanical displacement device, for example. Further examples of charge indicators 408 may be open cell foam, closed cell foam, a spongy material or an elastomer that expands on discharge of a fluid, a fluid drawn into an increasing volume or a lever based indicator. The fluid enclosure 404 or a portion of the enclosure may change color due to the deformation, for example.

The portion of electronic device 402 may be part of a fluid enclosure system, such as fuel cell system, for example. The fluid enclosure system may include a volume less than about 1000 cubic centimeters, for example. Examples of electronic devices include a cellular phone, satellite phone, PDA, laptop computer, computer accessory, ultra mobile computer, display, personal audio or video player, medical device, television, transmitter, receiver, lighting device, flashlight or electronic toy. A fuel cell system may include at least one or more components, a charge indicator in contact with the one or more components, and one or more fuel cells in contact with one or more of the components and charge indicator, for example.

Figure 7:
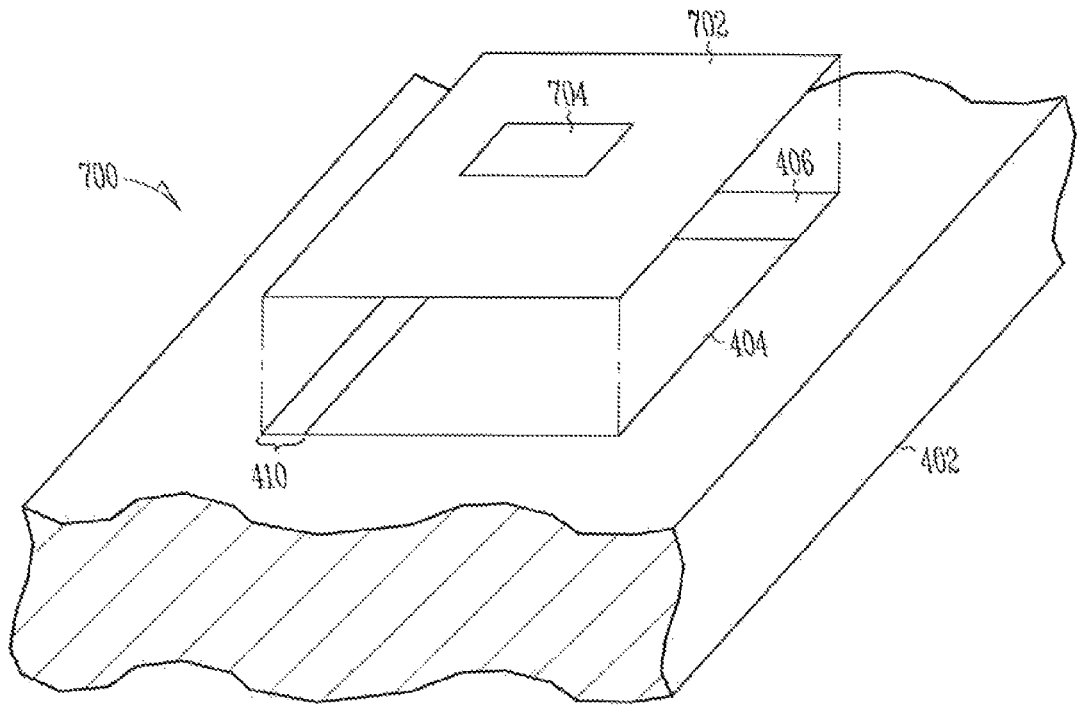
FIG. 7 illustrates a perspective view of a portion of an electronic device and a fluid enclosure including an observation window, according to some embodiments.
Figure 8:
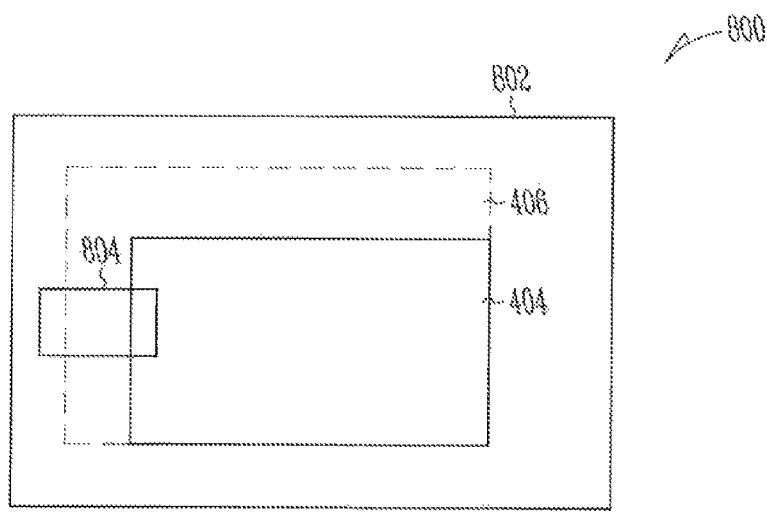
FIG. 8 illustrates a schematic view of a fluid enclosure including an observation window, according to some embodiments.
Figure 9:
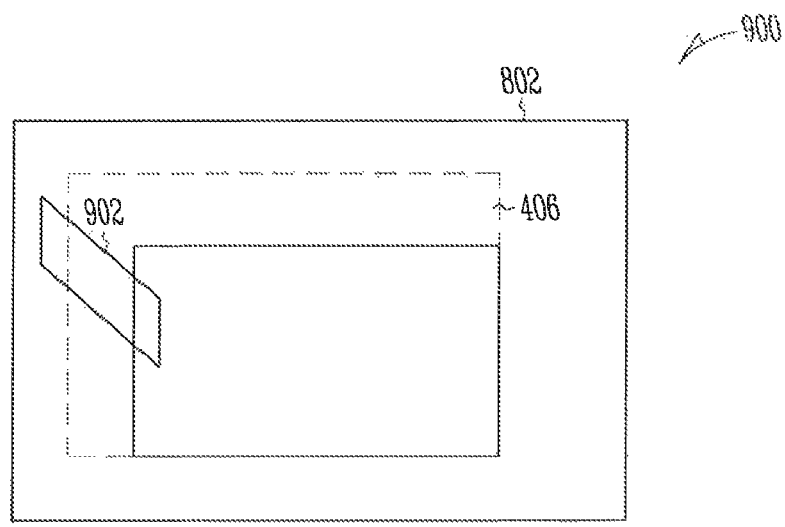
FIG. 9 illustrates a schematic view of a fluid enclosure including an observation window at an angle less than perpendicular, according to some embodiments.

Referring to FIG. 7, a perspective view of a portion of an electronic device and a fluid enclosure including an observation window 700 is shown, according to some embodiments. A portion of an electronic device 402 may surround a fluid enclosure 404 and a cavity 406 enclosing the fluid enclosure 404. A cover 702 may contact the cavity 406 and the fluid enclosure 404. The cover 702 may have an observation window 704 disposed within in order to visually observe changes in the dimensions of the fluid enclosure 404, such as by observing the changing distance 410 between the cavity 406 and fluid enclosure 404, for example. The observation window 704 may be an observation window 804 at an angle about 90 degrees or an observation window 902 at an angle less than about 90 degrees, for example (FIGS. 8 and 9, respectively). If the observation window 902 is at an angle less than about 90 degrees (about 50 degrees would be an example), then the dimension change of the fluid enclosure 404 may be more observable or amplified. The dimension change of the fluid enclosure 404 may be visually noted using color stripes, hash marks or grids, for example.

Figure 10:
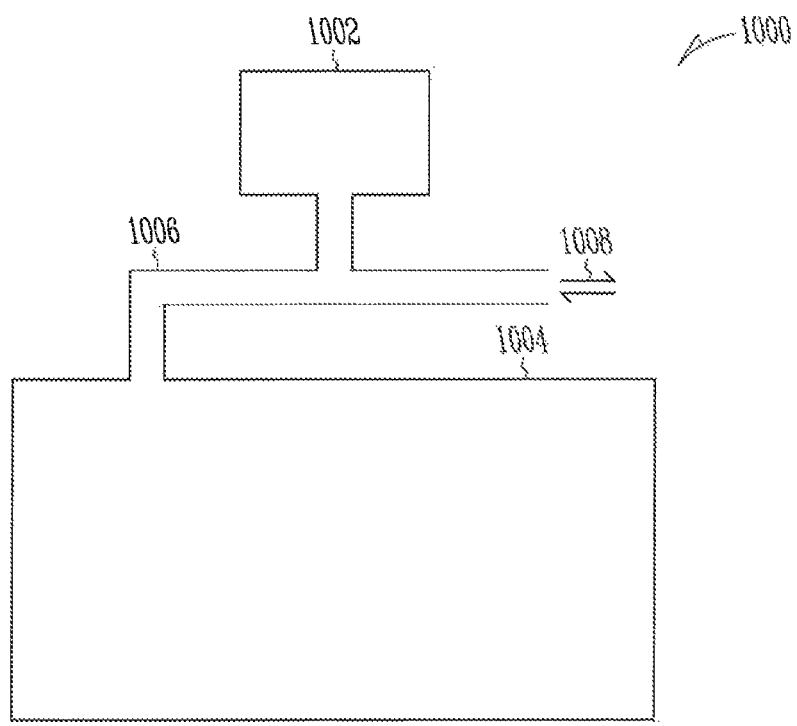
FIG. 10 illustrates a schematic view of a state of charge indicator system utilizing more than one fluid enclosure, according to some embodiments.

Referring to FIG. 10, a schematic view of a state of charge indicator system utilizing more than one fluid enclosure 1000 is shown, according to some embodiments. The state of charge of a larger fluid enclosure 1004 may be indicated by the correlated state of charge of a smaller fluid enclosure 1002 associated with a charge indicator, for example. Fluid may pass through a connection 1006 before or after contacting the fluid inlet/outlet 1008. If substantially the same fluid or fluid storage material is utilized in each enclosure, the state of charge of the smaller fluid enclosure 1002 may be utilized as an indication of the state of charge of the larger fluid enclosure 1004, without it being separately monitored.

Figure 11:
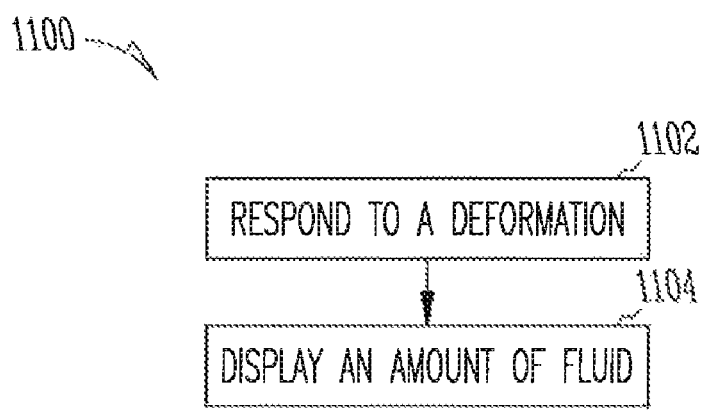
FIG. 11 illustrates a block flow diagram of a method of using a state of charge indicator, according to some embodiments.

Referring to FIG. 11, a block flow diagram of a method of using a state of charge indicator 1100 is shown, according to some embodiments. A charge indicator may respond 1102 to a deformation of a component. A state of charge or a mass of fluid may then be displayed 1104. Displaying may include converting the response to a digital display, such as on an LCD screen, for example. Responding 1102 may include displacing a solid, displacing a liquid or resisting an electrical signal, for example.

In some embodiments, a fluid enclosure is included in which a structural filler within the enclosure supports the stress applied by the internal fluid pressure rather than having that pressure be fully supported by the enclosure wall as is the case for traditional fluid enclosures. The enclosure may include a structural filler with an outer enclosure wall conformably coupled to it. Since the outer enclosure wall bonds to the structural filler, the fluid pressure applied to the enclosure is fully supported as isostatic tensile stress in the structural filler. The only significant stress that the outer enclosure wall experiences may be due to straining of the structural filler. The burst pressure of the enclosure is therefore limited to the ultimate tensile strength of the structural filler or the bond between the structural filler and the outer enclosure wall. This architecture allows compact, lightweight, and conformable fluid enclosures to be built that can support significant internal pressures without the encumbrance of thick enclosure walls.

Figure 12:
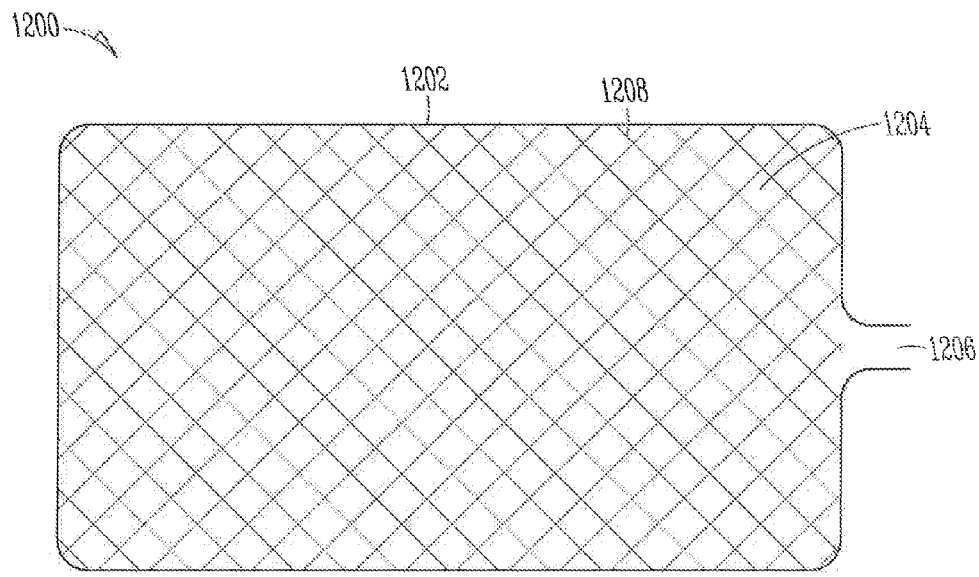
FIG. 12 illustrates a cross-sectional view of a fluid enclosure of an embodiment.

Referring to FIG. 12, a cross-sectional view of a fluid enclosure 1200 is shown, according to some embodiments. A structural filler 1204 may be surrounded by an outer enclosure wall 1202. The structural filler 1204 may be conformably coupled to the outer enclosure wall 1202, which, may be represented by a bond 1208. One or more optional features 1206 may be utilized. Optional feature 1206 may be, for example, a valve, regulator, pressure relief device, flow element, cap, fitting, vent, etc. or some other form of fluidic component associated with a fluid enclosure that can act to communicate between an enclosure and an external device or ambient environment, to observe or control a fluid, or act as a structural component.

The structural filler 1204 may include a material with a sufficient tensile strength to withstand the internal pressure of the fluid enclosure 1200, when pressurized with a fluid. Structural fillers may be solid. Structural fillers 1204 may include metallic or plastic lattices, composite hydrogen storage materials, nano-structured carbon foams, aerogels, zeolites, silicas, aluminas, graphite, activated carbons, micro-ceramics, nano-ceramics, boron nitride nanotubes, borohydride powder, palladium-containing materials or combinations thereof, for example.

The structural filler 1204 may include a material capable of occluding/desorbing a fluid, such as a metal hydride. This results in a material with sufficient tensile strength and fluid occluding/desorbing properties, such as composite hydrogen storage material, nano-structured carbon foams, aerogels or zeolites, for example. In addition, the fluid enclosure 1200 may include a structural filler 1204 and a separate, fluid occluding/desorbing material, such as a metal hydride powder or clathrate. For example, the structural filler 1204 may be inert to the fluid being stored and the fluid enclosure may separately include a fluid occluding/desorbing material. If a lattice, the structural filler 1204 may include small pores. Pores in the structural filler 1204 may be used to hold fluid occluding/desorbing materials, such as metal hydrides or clathrates, for example. A methane clathrate may be used to store methane efficiently at high pressure and could be used in conjunction with a structural filler 1204, such as a metal lattice.

The structural filler 1204 may be conformably coupled to the outer enclosure wall 1202, creating a bond 1208. As the force due to internal, pressure within the fluid enclosure 1200 increases, the load may be transferred directly into a tensile load on the structural filler 1204, rather than internal pressure being amplified into tensile load on .the outer enclosure wall 1202. The internal pressure of the fluid enclosure 1200 may be affected by the amount of fluid stored. In addition, the amount of stress applied to the fluid enclosure 1200 may be affected by the mechanical stress associated with contacting/releasing a fluid from a storage material, such as hydrogen occluding/desorbing from a metal hydride, for example.

The structural filler 1204 may have a continuous, uniform thickness throughout the fluid enclosure 1200. Alternatively, the structural filler 1204 may include pockets or areas of discontinuous thickness or density, for example. One case may be where an irregularly shaped fluid enclosure 1200 calls for more structural support, such as in a corner, the structural filler 1204 may be more dense or include a greater portion of the available space within that area of the fluid enclosure 1200.

The outer enclosure wall 1202 may include a multitude of materials due to the low stress applied to the outer enclosure wall 1202. The outer enclosure wall 1202 may include a polymer or metal or multiple layers of each, for example. The outer enclosure wall 1202 may be polypropylene, Kynar Flex® (vinylidiene fluoride hexafluoropropylene copolymer) (available through Arkema Inc, Philadelphia, Pa.), polyethylene, polyvinylidene fluoride (PVDF), hexafluoropropvlene vinylidene fluoride copolymer, cross-linked copolymers, polytetrafluoroethylene (PTFE), perfluoro alkoxy (PFA), thermoplastic polyesters (for example, Nylon.TM.), or combinations thereof, for example. The outer enclosure wall 1202 may be formed of the same material as at least a portion of the structural filler 1204, for example. The outer enclosure wall 1202 may be a sheet or a solution, prior to application. The outer enclosure wall 1202 does not have to be rigid or in any pre-formed shape. The outer enclosure wall 1202 may act as a barrier to the exit of a fluid from the structural filler 1204.

Because the structural filler 1204 may be bonded to the outer enclosure wall 1202, the stresses induced on the outer enclosure wall 1202 become independent of the geometry chosen. In conventional enclosure designs, the geometry of the enclosure strongly dictates the relationship between the stress in the enclosure wall and the internal pressure. If a structural filler 1204 is conformably coupled to the outer enclosure wall 1202, virtually any geometry of the fluid enclosure 1200 may be utilized, so long as the tensile strength of the structural filler 1204 and the bond 1208 between the structural filler 1204 and outer enclosure wall 1202 is larger than the internal pressure. The structural filler 1204 may be formed into a desired shape before the outer enclosure wall 1202 is conformably coupled to it.

The outer enclosure wall 1202 may have a uniform or a varying wall thickness, for example. The outer enclosure wall 1202 may have a greater wall thickness around optional features 1206, for example. The outer enclosure wall 1202 may have an average wall thickness of less than about 5000 microns, less than about 1500 microns, less than about 500 microns, less than about 300 microns, less than about 100 microns, less than about 50 microns, less than about. 10 microns or less than. about 1 micron, for example.

Figure 13:
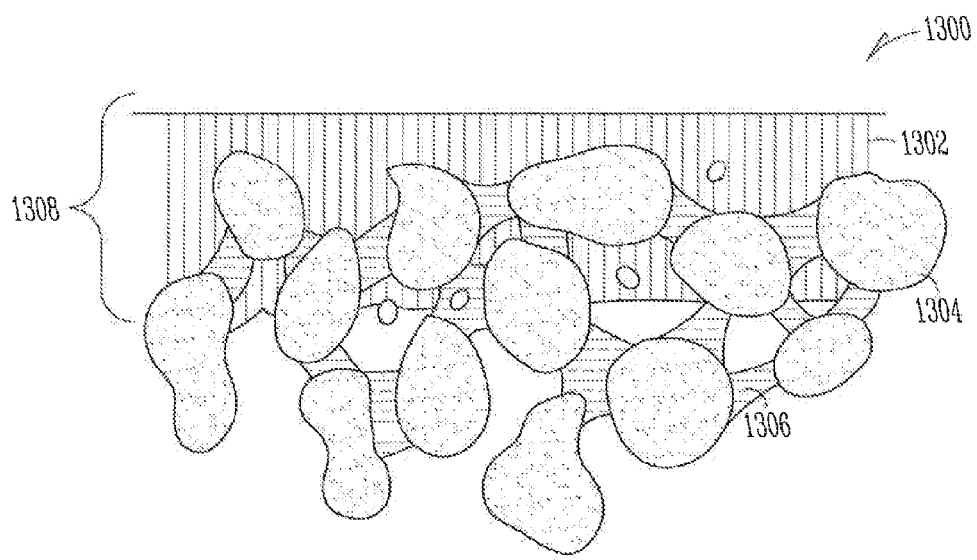
FIG. 13 illustrates a cross-sectional view of a portion of a fluid enclosure of an embodiment.

Referring to FIG. 13, a cross-sectional view of a portion of a fluid enclosure 1300 utilizing a composite hydrogen storage material is shown, according to some embodiments. Active particles 1304 are immobilized by a binder 1306, making up the composite hydrogen storage material, which is an example of a structural filler 1204. The outer enclosure wall 1302 penetrates within the interface region 1308, conformably coupling to the structural filler.

The interface region 1308 includes the bond between the structural filler and outer enclosure wall 1302 and may vary in thickness. The outer enclosure wall 1302 may be uniformly or near uniformly bonded to the structural filler so that a homogeneous or near homogenous interface 1308 may be formed, which prevents localized stress concentrations building up at the outer enclosure wall 1302. The outer enclosure wall 1302 material may be applied to the structural filler and allowed to penetrate the surface, creating a bond in the interface region 1308. The interface region 1308 may become stronger than the structural filler, so that a failure of the fluid enclosure 1300 may be a failure from the structural filler and not from the bond found at the interface 1308. The interface region 1308 may be less than about 50 microns, about 50-100 microns, about 100-150 microns, about 150-200 microns or more than 200 microns thick, for example.

In some embodiments, the outer enclosure wall may be conformably coupled to the structural filler by a variety of methods. Such methods include spraying, painting, dip coating, inset molding, electrostatic deposition, compression molding, transfer molding, injection molding; thermoset injection molding, extrusion; pultrusion, thermoforming, etc. The wall thickness may be increased by duplicating the coupling process or using a different coupling process in order to create multiple layers. Not only can multiple layers of the outer enclosure wall be applied, but one or more layers of other materials may be added. For example, if a thin outer enclosure wall is formed, fluid may slowly diffuse through the wall. A sealing layer may be applied to prevent such diffusion. Examples of a sealing layer may be a thin metallic layer, such as aluminum, copper, gold or platinum. The outer enclosure wall may be comprised of the same or similar material as the structural filler, or a portion of the structural filler, in order to increase the bond strength, for example. The layers may be heated or sintered after application.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A device for determining the mass of a fluid contained within a fluid enclosure, comprising:
 a charge indicator that responds to a deformation of a solid component in contact with the fluid contained within the fluid enclosure, wherein the solid component is contained within the fluid enclosure and wherein the solid component is a composite hydrogen storage material that includes active material particles mixed with a binder;
 wherein the deformation is a function of the mass of fluid contained within the fluid enclosure and wherein the deformation is used to determine the mass of fluid contained within the fluid enclosure.

2. The device of claim 1, wherein environmental temperature changes introduce less than about a 1% error in determining the mass of fluid contained within the fluid enclosure.

3. The device of claim 1, wherein environmental humidity changes introduce less than about a 1% error in determining the mass of fluid contained within the fluid enclosure.

4. The device of claim 1, wherein environmental barometric pressure changes introduce less than about a 1% error in determining the mass of fluid contained within the fluid enclosure.

5. The device of claim 1, wherein the deformation comprises a change in physical dimensions of the solid component.

6. The device of claim 1, wherein the deformation comprises about a 1% deformation.

7. The device of claim 1, wherein the deformation comprises about a 1% to about a 3% deformation.

8. The device of claim 1, wherein the deformation comprises about a 3% to about a 10% deformation.

9. The device of claim 1, wherein the fluid comprises a gas, a liquefied gas, a liquid or a combination thereof.

10. The device of claim 1, wherein the fluid comprises a gas.

11. The device of claim 1, wherein the fluid comprises hydrogen.

12. The device of claim 1, wherein settling in the composite hydrogen storage material introduces less than about a 1% error in determining the mass of fluid contained within the fluid enclosure.

13. The device of claim 1, wherein aging of the composite hydrogen storage material introduces less than about a 1% error in determining the mass of fluid contained within the fluid enclosure.

14. The device of claim 1, wherein the solid component comprises a metal hydride.

15. The device of claim 1, wherein the solid component comprises type AB, $AB_2$, $A_2B$, $AB_5$, BCC metal hydrides or combinations thereof.

16. The device of claim 1, wherein the solid component comprises $LaNi_5$, FeTi, or $MmNi_5$, wherein Mm refers to a mixture of lanthanides.

17. The device of claim 1, wherein the solid component comprises clathrates, silicas, aluminas, zeolites, graphite, activated carbons, nano-structured carbons, micro-eramics, nano-ceramics, boron nitride nanotubes, palladium-containing materials or combinations thereof.

18. The device of claim 1, wherein the solid component comprises the fluid enclosure, the fluid enclosure is a flexible fluid enclosure, and the flexible fluid enclosure is conformably coupled to the composite hydrogen storage material.

19. The device of claim 18, wherein the charge indicator comprises a color change in the flexible fluid enclosure.

20. The device of claim 1, wherein the charge indicator comprises a mechanical transducer.

21. The device of claim 1, wherein the charge indicator comprises open cell foam.

22. The device of claim 1, wherein the charge indicator comprises a fluid.

23. The device of claim 1, wherein the charge indicator comprises a lever indicator.

24. The device of claim 1, wherein the charge indicator comprises a visible window to view the deformation of a component.

25. The device of claim 24, wherein the window is at about a 90 degree angle to the component.

26. The device of claim 24, wherein the window is at an angle less than about a 90 degree angle to the component.

27. The device of claim 24, wherein the window is at about a 90 degree angle to the fluid enclosure and wherein the fluid enclosure is flexible.

28. The device of claim 24, wherein the window is at an angle of about 50 degrees to about 90 degrees to the component.

29. The device of claim 1, further comprising a second fluid enclosure.

30. The device of claim 29, wherein the second fluid enclosure contacts a fluid and wherein the fluid comprises substantially the same fluid as in contact with the first fluid enclosure.

31. The device of claim 30, wherein the charge indicator associated with the first fluid enclosure maintains a charge balance with the second fluid enclosure, such that the charge correlates and the second fluid enclosure is not monitored.

32. The device of claim 1, wherein the charge indicator comprises a mechanical indicator.

33. The device of claim 32, wherein the mechanical indicator comprises a. mechanical linkage.

34. The device of claim 1, wherein the charge indicator comprises a solid that changes an observable property when displaced.

35. The device of claim 1, wherein the charge indicator comprises a liquid.

36. The device of claim 1, wherein the charge indicator comprises an optical interference pattern.

37. The device of claim 36, wherein the optical interference pattern comprises a grid.

38. The device of claim 36, wherein the optical interference pattern comprises a faceted pattern, 39. The device of claim 36, wherein the optical interference pattern comprises pixels.

40. The device of claim 36, wherein the optical interference pattern provides one or more visible words upon straining of the component.

41. The device of claim 1, wherein the charge indicator comprises a transducer.

42. The device of claim 1, wherein the charge indicator comprises a charge-variable resistor.

43. The device of claim 1, wherein the charge indicator comprises a strain gauge.

44. The device of claim 1, wherein the charge indicator comprises an extensometer.

45. The device of claim 1, wherein the charge indicator comprises a fiber optic strain gauge.

46. The device of claim 1, wherein the charge indicator comprises a resistance strain gauge.

47. The device of claim 1, wherein the charge indicator comprises an array of conductors on the surface of the component and in contact with one or more fixed brushes.

48. The fuel cell system of claim 1, wherein the fluid enclosure is conformably coupled to the solid component.

* * * * *

UNITED STATES PATENT AND TRADEMARK OFFICE
CERTIFICATE OF CORRECTION

PATENT NO. : 8,166,833 B2  
APPLICATION NO. : 11/644999  
DATED : May 1, 2012  
INVENTOR(S) : Gerard F. McLean et al.

Page 1 of 1

It is certified that error appears in the above-identified patent and that said Letters Patent is hereby corrected as shown below:

On the face page, in field (56), under "Other Publications", in column 2, line 2, delete "fo" and insert -- of --, therefor.

In column 4, line 28, delete "Patent." and insert -- Patent --, therefor.

In column 5, line 24, delete "patent." and insert -- patent --, therefor.

In column 5, line 26, delete "21 ;" and insert -- 21 --, therefor.

In column 9, line 39, delete "internal," and insert -- internal --, therefor.

In column 9, line 42, delete ".the" and insert -- the --, therefor.

In column 9, line 63, delete "(vinylidiene" and insert -- (vinylidene --, therefor.

In column 9, line 65, delete "hexafluoropropvlene" and insert -- hexafluoropropylene --, therefor.

In column 10, line 30, delete "about." and insert -- about --, therefor.

In column 10, line 31, delete "than." and insert -- than --, therefor.

In column 10, line 60, delete "molding;" and insert -- molding, --, therefor.

In column 10, line 61, delete "extrusion;" and insert -- extrusion, --, therefor.

In column 12, line 3, in Claim 17, delete "micro-eramics," and insert -- micro-ceramics, --, therefor.

In column 12, line 45, in Claim 33, delete "a." and insert -- a --, therefor.

In column 12, line 56, in Claim 38, delete "pattern," and insert -- pattern. --, therefor.

Signed and Sealed this  
Fourteenth Day of August, 2012

David J. Kappos  
*Director of the United States Patent and Trademark Office*

UNITED STATES PATENT AND TRADEMARK OFFICE
CERTIFICATE OF CORRECTION

PATENT NO. : 8,166,833 B2
APPLICATION NO. : 11/644999
DATED : May 1, 2012
INVENTOR(S) : Gerard F. McLean et al.

It is certified that error appears in the above-identified patent and that said Letters Patent is hereby corrected as shown below:

In column 14, line 4, in claim 48, delete "The fuel cell system" and insert -- The device --, therefor.

Signed and Sealed this
Twelfth Day of February, 2013

Teresa Stanek Rea
*Acting Director of the United States Patent and Trademark Office*